May 26, 1964     H. S. McCONKIE     3,134,419
TIRE VALVE STEM
Original Filed Feb. 26, 1958
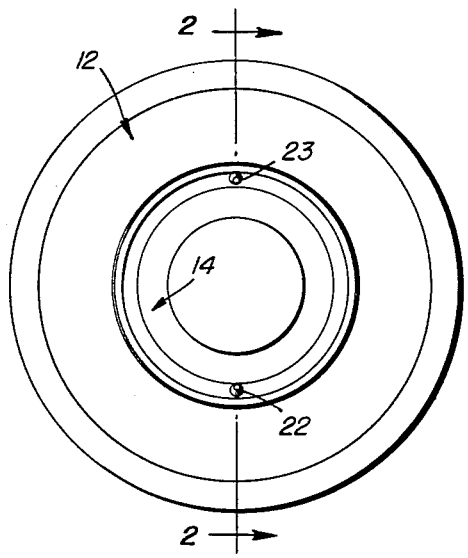
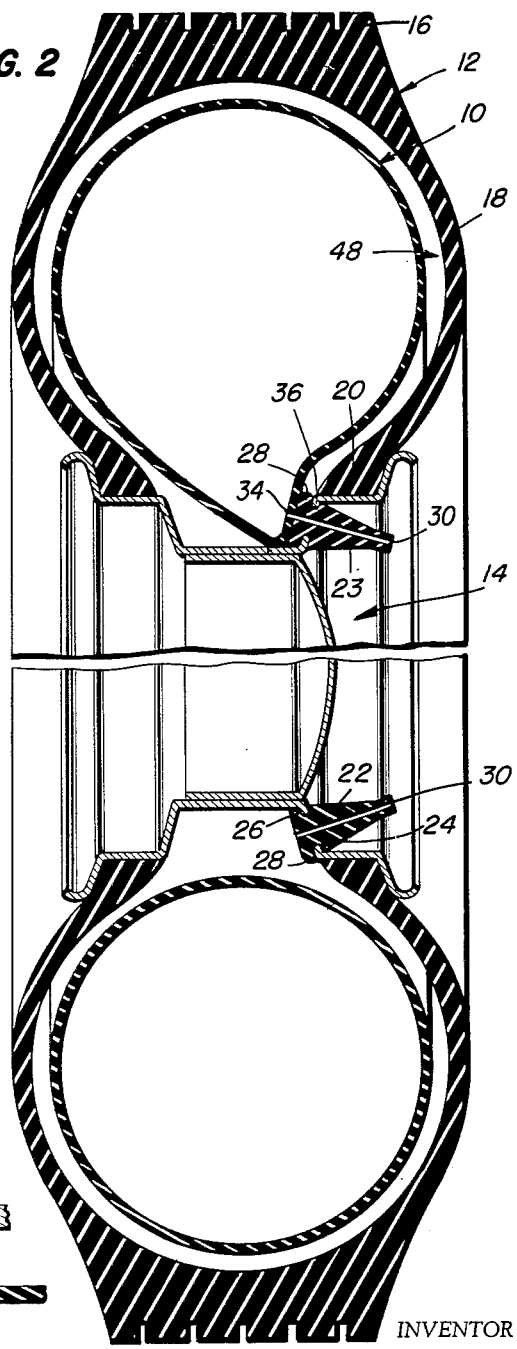
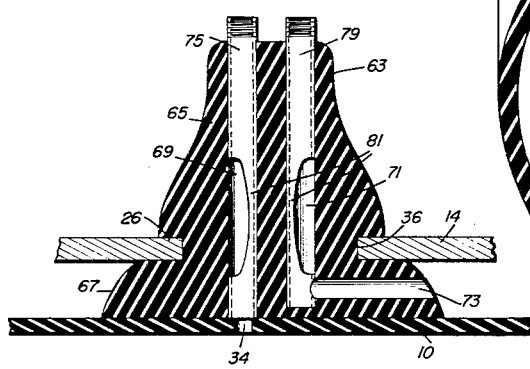
INVENTOR
HOWARD S. McCONKIE
BY *Trivia and Smiley*
ATTORNEYS

United States Patent Office 3,134,419
Patented May 26, 1964

---

3,134,419
TIRE VALVE STEM
Howard S. McConkie, 101 Etter St., Hot Springs, Ark.
Original application Feb. 26, 1958, Ser. No. 717,624, now Patent No. 3,038,516, dated June 12, 1962. Divided and this application Mar. 26, 1962, Ser. No. 182,396
3 Claims. (Cl. 152—427)

This invention relates to tires and more particularly to a tubeless tire provided with one or more inner tubes for blowout protection and is a division of copending application Serial No. 717,624, filed February 26, 1958, now Patent No. 3,038,516, dated June 12, 1962.

While tubeless tires have gained general commercial acceptance, they are subject to a number of disadvantages. These include: vulnerability to blowout or sudden collapse with consequent danger to the occupants of the vehicle; difficulty in installing and need for special tools to mount the tires on wheel rims; the danger of rolling the tires off the wheels on sharp turns when mounted on heavy or fast vehicles; the inability of readily ventilating the interior of the tire to prevent rotting by water condensed therein; and the difficulty of locating small leaks or blemishes in the tire without dismounting the tire or the wheel.

It is a primary object of this invention to obviate these disadvantages by provision within a tubeless type tire of an inner tube whose valve stem is air sealed to the rim upon which the tire is mounted to preserve the air sealing chamber within the tubeless type tire.

It is a further object of the invention to provide a plurality of air compartments within a tubeless type tire so that the wheel may be continued to be used safely even after sudden puncture of the tire.

Another object of the invention is to provide an inner tube within a tubeless type tire, the tube being inflated to a much greater pressure than the tire so as to carry most of the load while the lower pressure in the tire prevents pinching of the tube, provides ventilation of the tube and tire, and provides a test pressure of the tire to determine small leaks, cracks and other flaws before they become serious.

Yet another object of the invention is to provide an inner tube for a tubeless type tire which is easy to mount and inflate and which enables the tubeless type tire itself to be more easily mounted and inflated.

A further object is to provide in a safety tube, for use within a conventional tubeless type tire, a valve stem which protrudes through a different opening in the rim than that used for passage of the tire inflation valve stem, and which may be air sealed at said opening in a number of ways including the use of a portion of the tube or tube stem to provide such air seal.

Another object is to provide multiple airways in one self-sealing valve stem.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a side elevation of a wheel assembly embodying the invention which includes a tubeless type tire mounted on a drop center rim and assembled with an inner tube within the tire;

FIG. 2 is an enlarged section of the tire assembly taken on line 2—2 of FIG. 1; and FIG. 3 is an enlarged axial section of a combined tire and tube valve stem which may be used in place of the separate stems shown in FIG. 2.

Referring now to the drawings, the invention is shown in FIGS. 1 and 2 embodied in an inner tube, indicated generally at 10, which is semifloated within a conventional tubeless type tire 12 mounted on a drop center rim 14. The details of construction of the tire are well-known to those skilled in the art and need not be described here. It is sufficient to say that the tire has the usual tread 16, sidewalls 18 and beads 20.

Tire 12 is inflated by means of one or more valve stems 22, FIG. 2, and assembled valves, not shown. The valve stem 22 is formed of resilient material and pulled through an opening 24 in the rim 14. During this operation, the conical portion of the stem is compressed until the walls of the rim opening 24 fall within an annular groove 26 in the valve stem at which time the walls of the stem groove expand to grasp the rim opening in air sealing engagement. The annular groove 26 is positioned between the conical portion of the stem and a disclike flange 28. The valve stem is provided with a bore 30 for reception of a valve assembly.

The inner tube 10, which may also be of conventional construction as used with tubed tires, is slightly modified in the drawing, and comprises a thin walled, endless rubber tube, doughnut shaped when inflated, to which may be cemented, vulcanized, or otherwise secured, a valve stem 23 for protrusion through a second opening 36 in the rim 14.

The tire 12 may be inflated with air under pressure exceeding atmospheric pressure, and it is, therefore, of the utmost importance that the opening 36 in the rim 14, for the passage of the inner tube valve stem, be air sealed to prevent loss of pressure in the tire. A number of different types of conventional inner tube valve stems may be used provided that they are modified to accomplish such air sealing of the rim opening.

The tapered compressible valve stem 23 is similar to stem 22, but its base 28 is vulcanized to the tube 10 with the tube opening 34 in alignment with the stem air channel 30. Between the disclike flange 28 and the tapered portion 29, is formed the channel or groove 26 whose walls engage the wall of the rim opening 36 with airtight pressure.

To mount the tire 12 and tube 10 on rim 14, one bead of the tire is forced over the rim flange. The inner tube is then placed in the tire and the valve stem 23 is inserted in the rim opening 36 from the inside and pulled through the opening compressing the conical body of the valve until the valve stem groove 26 closes about the rim wall surrounding the opening. If desired, the walls of the groove 26 may be coated with cement which upon hardening will further ensure permanent air sealing of opening 36. The tubeless tire valve stem 22 is similarly installed and then the second bead of the tire is mounted. The operator next inflates the inner tube with the desired mounting pressure. For example, this pressure may be in the order of 40 lbs./square inch. The tube 10 will expand to fill the entire space within the tire 12 forcing the beaded edges 20 into air sealing engagement with the adjacent flanges of rim 14.

Normally, tubeless type tires require a special tool to be applied circumferentially to the tread to compress the tire radially and spread the side wall edges into sealing engagement with the rim, and such tools require two men to position and operate them. The use of the inner tube whose inflation accomplishes this task quickly and easily eliminates the need for such special tools. Therefore, an important advantage is derived apart from the safety gained by the double air chamber formed by the addition of an inner tube.

The mounting tube is retained in the tire to function as a safety tube. Since the tube, during the mounting process, occupies all the tire space, it can again fill the tire in an emergency. Tube pressure is now reduced to the figure desired in an emergency, for example, 20 pounds. Then, air is applied to the tubeless tire valve stem 22 and pressure raised to the desired operating level, for example, 30 pounds. Since the pressure in the tire is higher than that in the tube, the latter will be compressed against its self-contained air and, at such time, the pressure in the tube will equal that in the tubeless tire air space. This pressure will compress the tube and move it away from the inner surface of the tire 12 leaving a space 48 completely surrounding the tube 10 except in the area where the tube is secured to valve stem 23.

The assembly of a tubeless type tire with an inner tube in the described manner presents a number of additional important advantages. First, if the tire 12 is punctured or blows out, no danger will result to the occupants of the vehicle since the inner tube 10 will then expand to occupy the entire space within the tire and the wheel may be driven in this condition for an indefinite period of time.

Second, the space 48 between the inner tube and the tire prevents pinching of the tube in contrast to normal tubed tires in which the tube completely fills the space inside the tire and is constantly subjected to rubbing, chafing, and pinching by the inner wall of the tire.

FIG. 3 illustrates a multiple passage valve stem 63 which may be used to inflate both the tire and the inner tube, avoiding the need for two separate valve stems, such as 22, 23 shown in FIGS. 1 and 2. Stem 63 comprises a tapered compressible outer body 65 connected to a truncated base 67 which may be of metal but may also be formed partially or wholly of resilient material. The outer body and base are separated by the annular channel 26 which seats the wall of rim opening 36 in air sealing engagement when the stem body 65 has been pulled through the opening, as previously explained in connection with valves 22 and 23. The inner surfaces of the stem base 67 is vulcanized to the tube 10 with the stem bore 69 in alignment with opening 34 in the tube. A second bore 71 in the stem terminates short of the inner surface of the stem base and communicates with an angularly disposed air passage 73, partially or completely within the base 67, which opens into the tire space between rim 14 and the tube. The air bores 69 and 71 are lined by metal reinforcing tubes 75 and 79. A similar liner can be inserted or molded in air passage 73.

Tube liners 75 and 79 are interrupted in their central portions except for narrow strips 81 which connect the ends of the tubes. This construction permits the body 65 of the stem to be constricted while being inserted and pulled into seating position in the rim opening 36, and gives an overall strength to the valve stem that would not exist if some of the metal of the liners did not extend through the rim aperture section of said valve stem. This is particularly true when the base of such valve stem is partially or wholly metal and such liners are thereby enabled to become integral with such valve stem base metal. This feature is equally valuable for single airway valve stems since weights may be attached to such valve stems. The metal liners 75 and 79 are also adapted to support valve assemblies, not shown. When they are inserted, it will be apparent that the tube 10 may be inflated through passages 69 and 34, while the tire may be inflated through passages 71 and 73. The valves seated in liners 75 and 79 independently permit the use of different pressures in the tire and tube.

It is to be understood that FIG. 3 is an illustrative embodiment which covers any compressible valve stem or valve stemlike device which creates an air seal with the rim when its annular groove is positioned under compression within the walls of a rim aperture and providing the stem possesses no airway, or more than one airway. Plural airways would all lead from outside the tire rim assembly to air spaces within the tire including any tube or tubes contained therein. These airways may have in cross section any size or shape and be in any combination of such. They may or may not have valve means in any combination since, in assuring ventilation for tires, it is desirable at times to be assured of an open airway leading to the tire space outside the tube. The airways may have metal or plastic linings, or any part of the same may be partly or wholly lined with a substantially noncompressible liner. As an example, in FIG. 3, linings 75 and 79 may terminate near where the cutout 81 is shown. This would give the usual metallic lined stem for the usual removable valve cores. Where no such linings are used and valves are desired, valve cores will be screwed or otherwise inserted therein and secured with air sealing engagement. The valve cores may be removable or may be bonded in position.

For the tubeless type tire which incorporates one or more safety or other type tubes, multiple airways can service each tube separately and also have an airway connection to the tire space that is outside of the tube. Connection with one tube would preferably be as shown in FIG. 3. However, where two tubes are employed, each tube can be vulcanized to a different area of the base and be serviced readily by its own independent airway. Such plural airway valve stem, if it is to be used for a tubeless type tire, could have an additional airway leading to the space within the tire and outside the tubes. This airway might take the form as shown and numbered 71 and 73. Alternatively, passage 71 may extend down to the tube. In such case, with the tube not vulcanized in this area, air can be admitted to the tubeless tire air space. Since it is desirable to be able to deflate the tire of such latter embodiment, it is preferable that a radial groove be placed in base 67 or a channel as 73 so that such groove or channel will not be so compressed by the inflated tube as to seal such airway from the tire air space.

It will be understood that the air seal of the compressible valve pictured in FIG. 3 is to the surface of the circular wall of the rim aperture; that the body 65, while shown in some elongation, can in fact be eliminated altogether since the airways can be formed without metal linings and valve cores can be screwed into such compressed airways at the rim level. The same feature is available to single airway valve stems that are self-sealing to the rim.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A valve stem, for use in independently inflating a tubeless type tire and a tube assembled therein on a rim, comprising a tapered tubular body of resilient material having an enlarged base, a circumferential, annular groove in the exterior surface of said body above the base for assembling the body in a rim opening with air sealing engagement, a plurality of axially directed, independent, air inflating passages in said body, at least one of said passages passing entirely through the body and base for communication with the interior of a tube, an angularly disposed passage through said base communicating with another of said passages for admitting air to a tire, and a rigid tubular liner inserted in each of said axial passages and extending from the end of the body opposite said base to and past the level of said circumferential groove, each of said liners being interrupted except for a narrow strip adjacent the level of said groove to permit entrance into the liner of the material of the body under compressive force resulting from insertion of the body into a rim opening.

2. A valve stem according to claim 1 wherein the interruptions in said liners extend above and below the level of said circumferential groove.

3. A valve stem according to claim 1 wherein a rigid tubular liner is inserted in said angularly disposed passage of said base.

References Cited in the file of this patent

UNITED STATES PATENTS

| | | |
|---|---|---|
| 2,269,244 | Berry | Jan. 6, 1942 |
| 2,322,500 | Armstrong | June 22, 1943 |
| 2,608,235 | Wyman | Aug. 26, 1952 |
| 2,798,528 | Herzegh | July 9, 1957 |
| 2,995,168 | McCord | Aug. 8, 1961 |